July 17, 1934.  P. M. MILLER  1,966,827
VEHICLE WHEEL
Filed Jan. 21, 1931   4 Sheets-Sheet 4
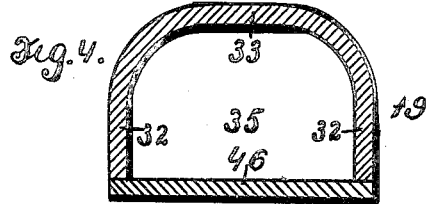
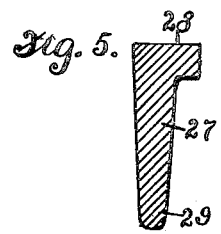
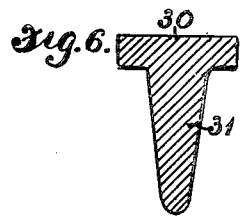
Inventor
Philip M. Miller

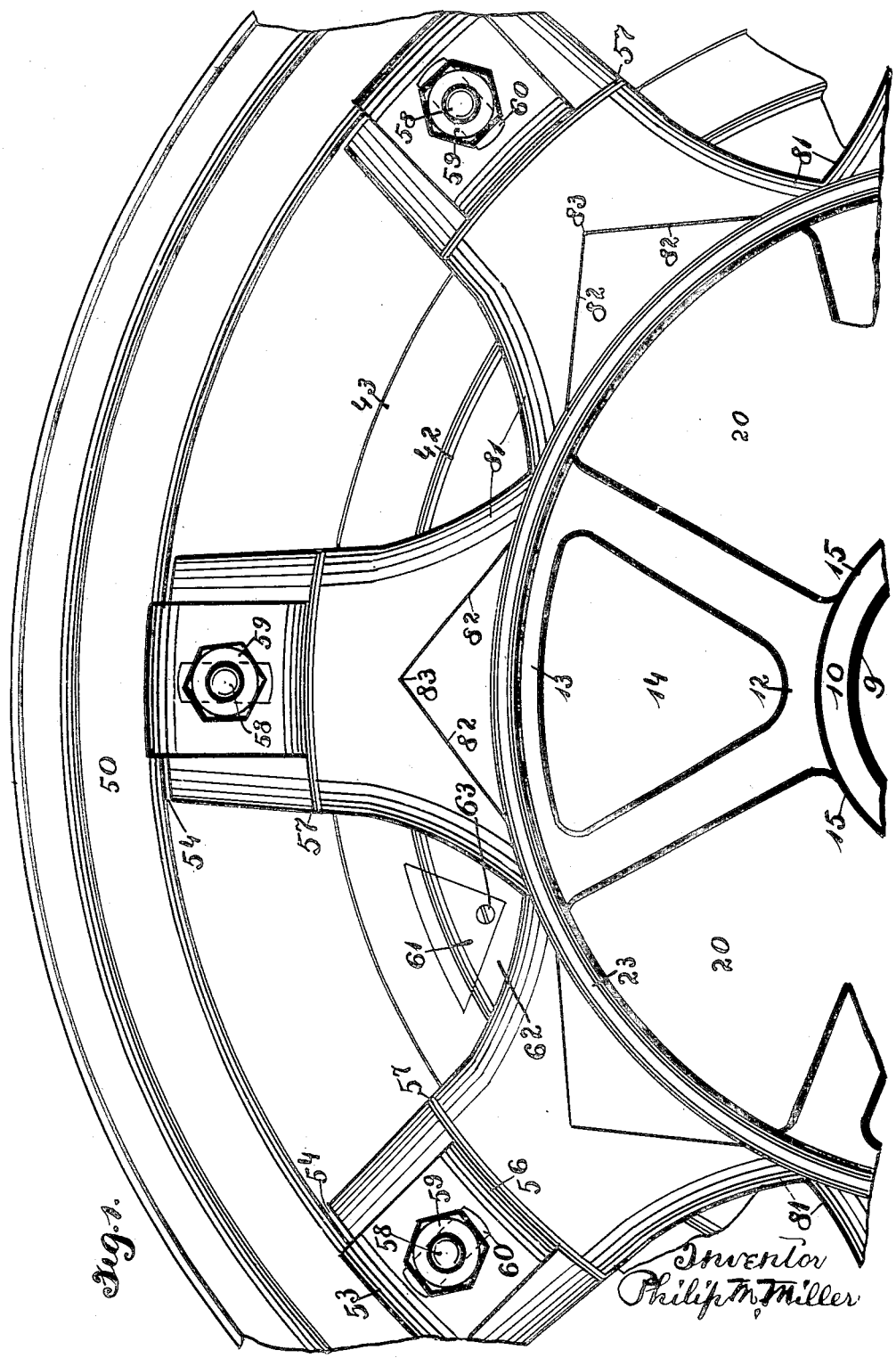

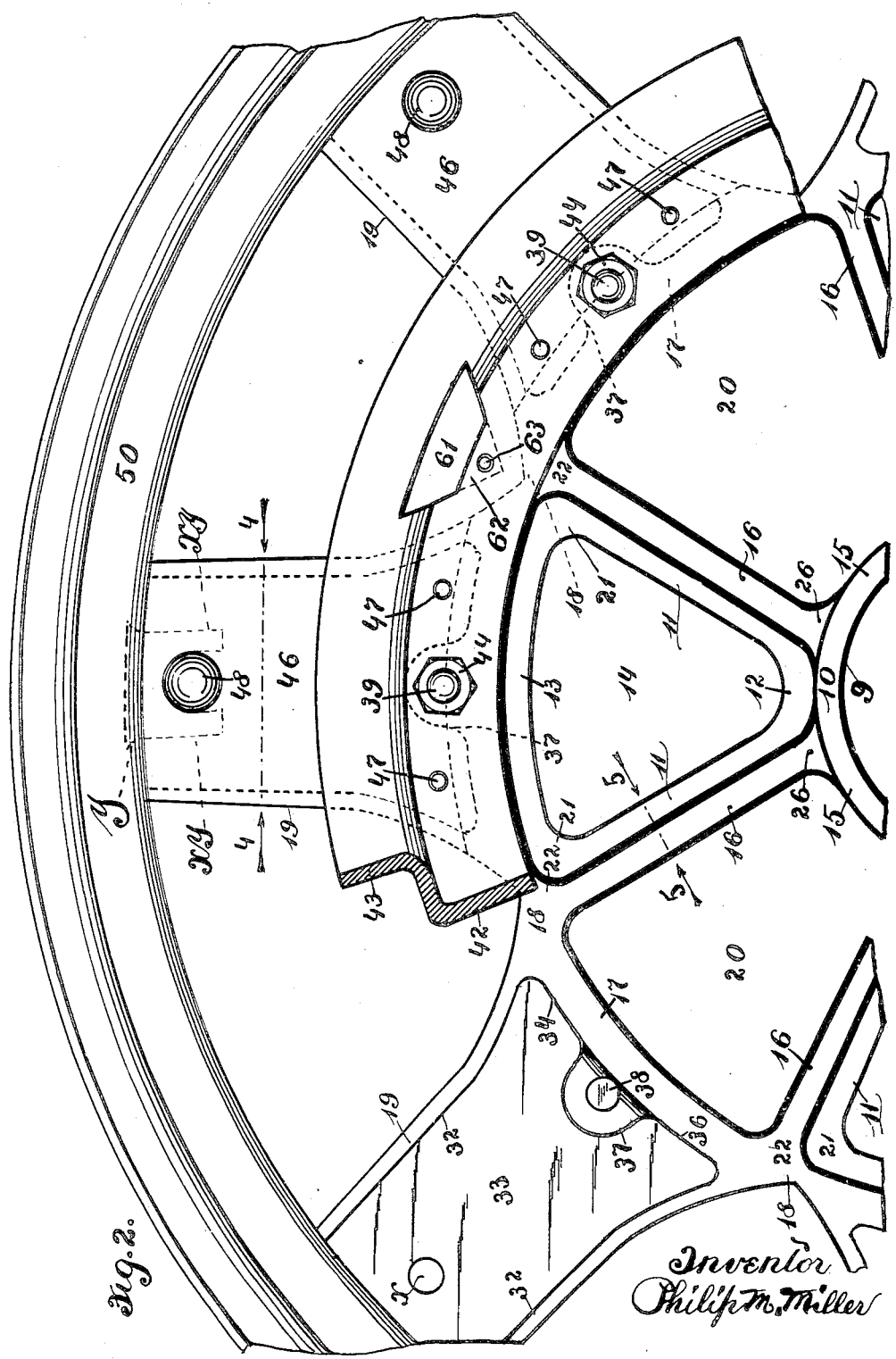

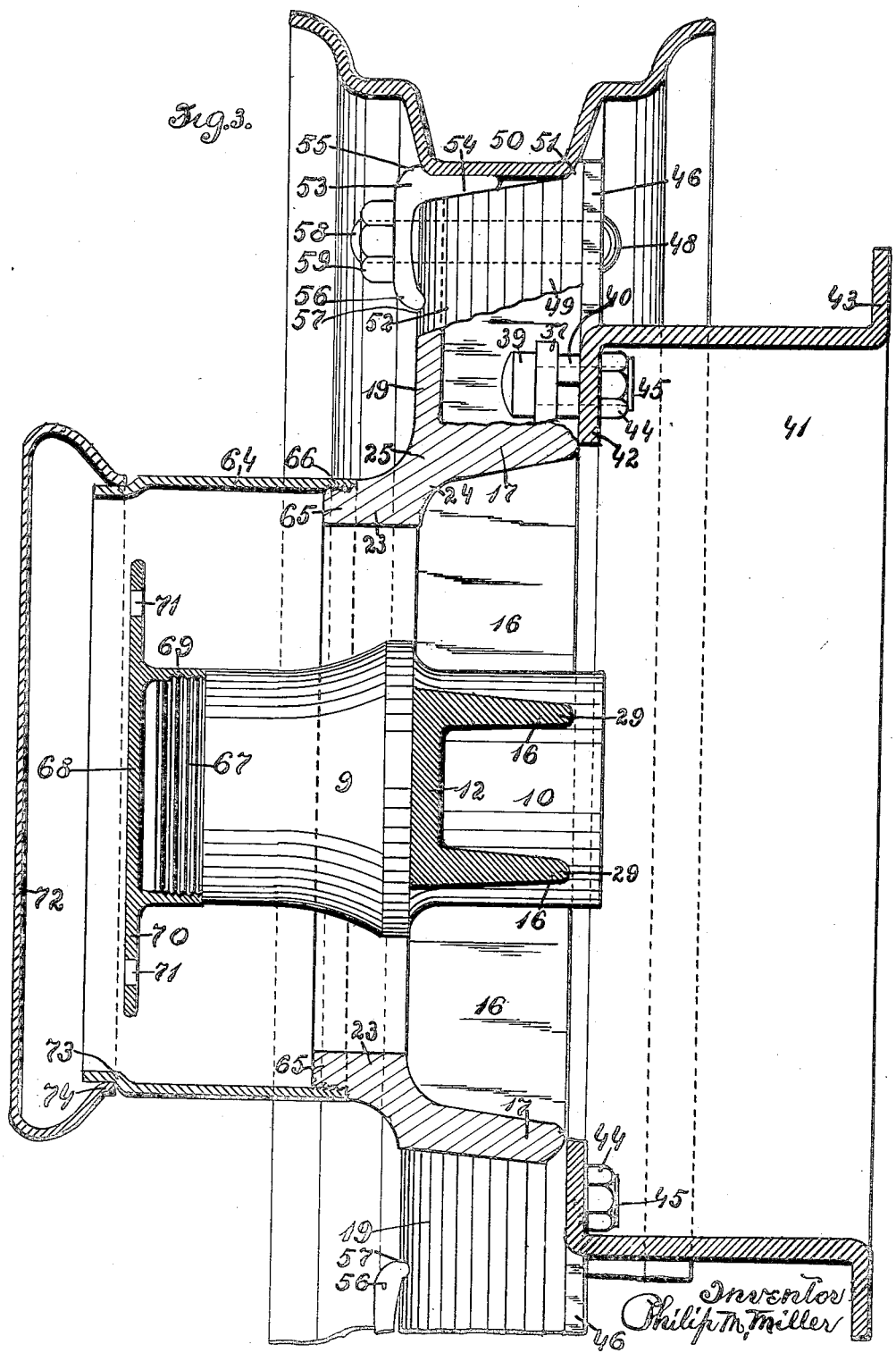

Patented July 17, 1934

1,966,827

UNITED STATES PATENT OFFICE 1,966,827

VEHICLE WHEEL

Philip M. Miller, Cleveland, Ohio

Application January 21, 1931, Serial No. 510,248

4 Claims. (Cl. 301—6)

This invention relates to wheels for motor vehicles, and the primary object of the same is to provide a wheel assembly including a spider member of cast metal which simulates in appearance the conventional artillery type wheel and which is relatively light in weight and of hollow ventilated construction, yet embodies ample strength to withstand the duties it is to perform.

Another object of the invention is to provide a spider member of cast metal which has features which facilitate casting at the foundry.

Another object is to provide a wheel assembly including a spider member of open construction to facilitate casting, lighten and ventilate the wheel together with a brake drum member which is particularly designed to cooperate with the said spider.

The above and other objects and advantages of the invention, including various novel constructions of parts, will be apparent from the following description of the illustrative embodiment shown in the accompanying drawings, in which—

Fig. 1 is an outboard side elevation of a portion of a wheel embodying the features of the present invention, the free spoke ends thereof carrying a demountable rim while the central part is exposed to show the detail construction of the outer face thereof;

Fig. 2 is a view in inboard side elevation with the drum flange in section to show its detail construction;

Fig. 3 is a vertical cross section of the complete wheel having one side sectioned and showing the detail construction thereof;

Fig. 4 is a cross section of Fig. 2 taken on the line 4—4 as indicated by the arrows;

Fig. 5 is a cross section of Fig. 2, taken on the line 5—5 as indicated by the arrows;

Fig. 6 is a view similar to Fig. 5 of a modified form.

The invention in the form illustrated is designated by corresponding characters referring to parts thereof, in which the complete wheel comprises a skeleton spider structure having free spoke ends adapted to carry a demountable rim and centrally integrally provided with a hub member and a shell assembly thereby forming an outstanding lateral part to conform to the lines of the construction as a whole.

The central structure of the complete wheel spider structure, as particularly shown in Figs. 1, 2 and 3, comprises a central hub having a front portion 9 and rear portion 10 and a series of triangular skeleton sections circumferentially integral therewith and radially extended therefrom and integrally merged with the intermediate circumferential base of the intermediate portion of the complete spider structure. Extending from the outer part of the rear portion 10, are integral radially extending ribs 11 having an upright wall 12 between the inner ends thereof to form together an integral part of the outer and rear hub portions 9 and 10. The outer ends of the respective ribs 11 are merged with an arched wall 13 at the opposite sides thereof, thereby forming a triangular opening 14 for the purpose of eliminating material in the manufacture and affording a ventilating means. Extending from the arched side portions 15 of the hub portion 10, are integral walls 16 each formed on the inner face of each rib 11 and the outer ends thereof are merged with an intermediate, circumferentially extended transverse base 17, thereby bracing the outer portions of the ribs 11 and walls 16. With the formation of the ribs 11 and walls 16, each integral member collectively forms an L-shaped column in cross section as particularly shown in Fig. 5, and provides the required strength to join both the hub portions 9 and 10 with the central, arched portions 13 and circumferentially arched transverse base 17 for the formation of the skeleton central part of the complete spider structure. The outer ends of the ribs 11 and side walls 16 are, as shown at 18, merged with the sides of the adjacent inner ends of the spokes 19 in order to join the spokes together for the formation of a concrete outer portion of the spider structure and for collectively engaging with the circumferential transverse base 17 to strengthen the position of the ribs 11 and walls 16 with reference to the integral engagement of the inner ends thereof with the hub portions 9 and 10. A triangular opening 20 is provided between the outer sides of the walls 16 and the inner faces of the hub portion 10 and inner face of the circumferential base 17 for the same purpose described in connection with the triangular opening 14. The outer ends of the walls 16 are further strengthened by the formation of the fillets 22 merging the ends thereof with the joints 18 in order to give strength to the spider structure at the inner face thereof, while the outer face of the structure is strengthened by the formation of the circumferential base 23 which, as particularly shown in Figs. 1 and 3, unites the inner ends of the spokes and merges with the outer portions of the walls 16 as particularly shown at 24. In connection with the described joint formation 24 an arched, circumferential surface 25 is provided for the purpose of affording means of extending the circumferential base 23 laterally outwardly and the outer face of the intermediate portion of the spider structure is arched in a manner such that a strong union is provided between the inner ends of the spokes, outer ends of the ribs 11 and walls 16 and the circumferential base 17. As is obvious, the respective walls 16, circumferential base 17 and circumferential base 23 each extends laterally in transverse with reference to the hub portions 9 and 10. The inner ends of the walls 16 are provided with fillets 26 which unite the walls 12 together with the hub portion 10 for an innermost central part of the spider structure, adapted for enclosing driving mechanisms of a vehicle.

As shown in Fig. 5, each wall 16 is of L-shape particularly shown as the wall 27 of tapered type extending from the wall 28 (shown in the drawings as rib 11) and terminating in the formation of the end 29. As a substitute for the L-shaped member, a T-shaped member may be provided as shown at 30 and 31 in Fig. 6. Either member L-shaped or T-shaped may be employed in the manufacture of the series of triangular sections hereinbefore described, and the object of having the respective members tapered is to eliminate material in the manufacture and provide means for easy removal of the complete spider structure from the sand at the foundry operations. By means of the provision of the L-shaped or T-shaped walls, strength is given to the central part of the structure and elimination of material in the manufacture of the spider structure is made possible without encountering defects that might appear after a casting is completed at the foundry.

As clearly shown in Figs. 2 and 4, each spoke 19 is of U-shape channel type, comprising side walls 32 and a front wall 33, the inner ends of which are merged with the transverse floors 34 each merged with the outer face of the circumferential base 17, thereby forming the open channel 35 as shown in Fig. 4. The outer portion 36 of each floor 34 is provided with an integral upright portion 37 provided with an opening 38.

In the opening 38 is secured a suitable bolt 39 which is threaded with a nut 40 in the manner such that the latter is engaged with the inner face of the upright portion 37 for rigidly locking the bolt in place, the bolt extending laterally and inwardly for the purpose which will be hereinafter described.

Brakedrums of the conventional types are usually manufactured of iron material containing about .25 to .35 of carbon, which consistency makes the flange thereof sensitively soft to the periodical application of brake mechanism to the extent such that the flange is subjected to distortion and a refacing the entire braking area is required as a result of such defect, for the reason that squeaking is being developed when the braking mechanism is applied to the flange when checking the moving vehicle on the road. In order to eliminate the above defect it is essential to provide a brakedrum having a high carbon content to make the flange hard and resisting to the application of braking mechanism of the vehicle, but such construction is relatively expensive. The conventional brakedrum as a whole is fastened to the flange of the conventional hub, which engagement is remote from the outer periphery of the wheel. As a result of such engagement of the drum with the hub, the drum is apt to become distorted, and a proper centralizing of the drum with reference to the wheel is obviously encountered with difficulty in the majority of cases.

Having the above defects in view, I provide a brake drum in the form of an angle flange member of high carbon content, for instance, as high as .50 to .60, which makes the flange surface hard and resisting to the periodical hard application of braking mechanism of the vehicle. The angle member is short and requires very little material to provide a drum member that will effectually perform its function.

As clearly shown in Fig. 3, the angle member comprises a circumferential flange 41, outer vertical wall 42 and outwardly extended flange 43. The laterally extended portion of each bolt 39 is passed through an opening provided in the vertical wall 42 and engaged with a nut 44, the outer portion of the bolt being peened as shown at 45, thereby fastening the angle member to the integral upright portions 37 and aligning with the inner face of the circumferential base 17. The angle member is correctly centralized with reference to the engineering requirements of providing a true alignment in relation to the concentricity of the complete wheel for a true operation of a pneumatic tire carried by the wheel, and the rigid engagement of the angle member with the wheel provides means whereby the intermediate portion of the wheel is considerably stiffened for strengthening the joints between the adjacent ends of the spokes.

In order to have the U-shaped channeled spokes, hereinbefore described and particularly shown in Figs. 2 and 4, transformed to tubular form, a plate 46 is spacedly fastened to the back face of the angle member, as at the vertical wall 42, by suitable means such as riveting shown at 47, to provide a series of spaced members each registering with the open inner side of each of the spokes, in the manner such that each member 46 extends outwardly and closes the entire length thereof, for the purpose of excluding therefrom extraneous substances when the wheel is in service on a vehicle on the road. As is obvious, the members 46 are fastened to the vertical wall 42 prior to the mounting of the angle member in relation with the upright portions 37, and form rigid parts thereof. When the angle member is in position and locked with the portions 37, each extended member 46 closes the open side of the spoke as shown.

For the purpose of completing the outer periphery on the free ends thereof for a mounting thereon of a demountable rim, a series of bolts 48 are each passed through an opening in the extended member 46 transversely through the body 49 of each spoke, and through an opening X in the front wall 33 of the spoke, in the manner such that each bolt is fixed rigidly therewith for a permanent engagement and fastening of each rigid member 46 in position. In connection with the rigid positioning of the bolts in the respective openings in the spoke ends and members 46, the outer ends of the spokes are considerably stiffened for strengthening their position with reference to the line extended towards the axis of the wheel. Since the angle member forming the brakedrum means is fastened to the outer portion of the wheel at two points, as hereinbefore described, the position of the brakedrum is strengthened and, likewise, the spokes are strengthened for rigidity with reference to joining with the intermediate parts of the spider structure.

A demountable "drop center" rim 50 is mounted on the inner side 51 of the free spoke ends 52 at one point of contact, and an L-shaped clamp member 53 is wedged on the inclined face 54 supporting the outer side of the rim by the raised portion 55 formed with the outer side of the clamp members 53, to force the rim laterally and inwardly on the bearing 51. The opposite portion 56 of each clamp member is engaged in a centering groove 57 provided in the outer face of the front wall of each of the spokes. To the projected threaded portion 58 of the bolts 48 is secured a nut 59 to force the clamp member inwardly and laterally, thereby locking the rim on the wheel for service.

Each clamp member is provided with a slot 60 through which the portion 58 of the bolt 48 is passed for engagement with the nut 59, to provide free longitudinal movement of the clamp with reference to the spoke when the nut is removed from the bolt.

As particularly shown in Fig. 2, the base of the rim 50 is provided with a lug Y rigidly engaged therewith and projected radially inwardly and engaged by the bolt 48 with the side prongs XY, the lug seating in the channel of the spoke and thereby providing a driving connection therebetween.

For the purpose of periodically inspecting the condition of the brake lining of the brake mechanism of the vehicle, a plate 61 is provided, which is secured to the body 62 in the vertical wall of the angle member 41 by means of the screw 63, thus covering the opening provided therein. When the plate is removed the opening is exposed together with the brake lining for inspection, after which the plate is replaced in position.

The outboard central wall of the spider member is extended in the form of a neck 65 having threads 66 thereon, and a nave-covering shell 64 is threaded on said neck.

In order to retain grease in the bore of the hub portion 9, to the threaded portion 67 is secured a member 68 having an internally threaded neck 69 engaged with the neck of the hub, as clearly shown in Fig. 3. The side flange 70 of the grease retainer 68 is provided with openings 71 for insertion thereinto of a spanner wrench to operate the grease retainer member.

A cap member 72 is mounted on the seat 73 formed at the outer end of the shell member and held by the side curved portion 74 forming a spring engagement therewith. As is obvious, the opening in the outer end of the shell is closed to exclude extraneous substances from the interior thereof, and simultaneously close the openings 14 and 20 in the central part of the spider structure.

The inner ends of the spokes are provided with opposite arched sides 81, each of which extends radially and outwardly and merges with the tapered side of the spoke. Extending from each side is an inclined line 82 meeting a convergently inclined line 82 at the center of the outer face of the spoke, for the purpose of providing ornamental outlines whereby the outer appearance of the complete spider structure is simulated to the appearance of the conventional wood artillery wheel.

Having thus described my invention, what I desire to secure by Letters Patent, is:

1. A cast metal wheel for motor vehicles, comprising a main spoked spider member adapted to be cast as an integral unit and formed with a hub, ribs projecting radially from said hub and merging into a transversely extended wall, said wall being formed with a series of relatively short tapering projections defining the spokes of the wheel, each spoke being substantially channel shaped in cross section, and a brake drum having a relatively short web secured to the peripheral portion of said wall at the base of the spokes and a series of plates secured to said web and fitting against the inner edges of the side walls of said spokes closing the channels of the latter and preventing ingress of foreign substances into the wheel through said channels.

2. A metal wheel assembly for motor vehicles, comprising a free spoked integrally cast metal spider member formed with a transversely-extended hub barrel, ribs projecting radially from said hub and merging with a transversely-extended annular wall which is peripherally arched and extended radially in the form of relatively short channeled spokes having free ends, brake drum-attaching lugs formed on the periphery of said wall and projecting into the channels of the spokes, and a brake drum member secured to said lugs and provided with radially-extended plates which fit over the channels of said spokes and exclude foreign substances from the wheel, said plates being secured to the rear walls of the spokes, to thereby also serve to reinforce the brake drum mounting and said spokes.

3. A metal wheel assembly for motor vehicles, comprising a free spoked integrally-cast metal spider member formed with a transversely-extended hub barrel, ribs projecting radially from said hub and merging with a transversely-extended annular wall which is peripherally arched and extended radially in the form of relatively short channeled spokes having free ends, brake drum-attaching lugs formed on the periphery of said wall and projecting into the channels of the spokes, a brake drum member formed with a reduced attaching web and a series of radially-extending plates, said web being attached to said lugs and said plates fitting over the channels in said spokes and closing the latter, and a series of rim-mounting bolts passed through the end walls of the spokes and anchored in said plates in substantially radial alignment with said lugs, to thereby reinforce the mounting of the said drum and also strengthen said spokes.

4. A metal wheel assembly for motor vehicles, comprising a free spoked integrally-cast spider member formed with a transversely-extended hub barrel, ribs having transversely tapered walls to facilitate casting formed integrally with said hub barrel and merging with an annular transversely-extended body wall which is arched peripherally and extended radially between said arches in the form of channel-shaped projections defining the spokes of the wheel, said transverse body wall forming the spoke base and closing the bottom of each channel, securing lugs formed on the inboard periphery of said wall and projecting radially into said channels, a brake drum having a reduced web which is attached to said lugs, and channel-closing reinforcing plates which are attached to the rear walls of said spokes.

PHILIP M. MILLER.